United States Patent Office 3,102,277
Patented Sept. 3, 1963

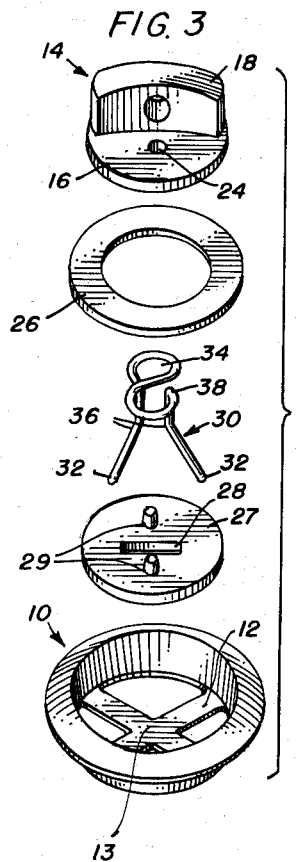
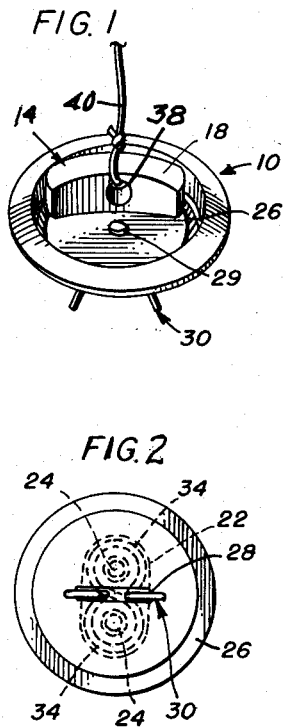
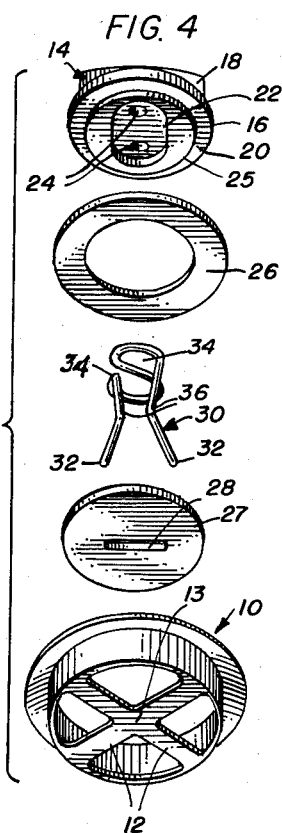
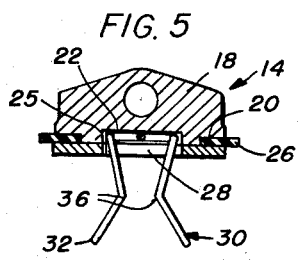
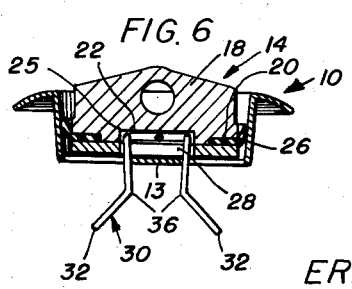
INVENTOR:
ERIC W. ANDERSON

3,102,277
DRAIN PLUG
Eric W. Anderson, 9123 S. Ada St., Chicago 20, Ill.
Filed Oct. 15, 1962, Ser. No. 231,321
2 Claims. (Cl. 4—295)

This invention relates to a new and improved drain plug for use in combination with the drain grid seat in kitchen sinks, bathtubs, wash bowls and other connections in which a drain plug is used. Many drain plugs have an intermediate rubber stopper which is intended to engage the drain seat, but it does not make a closed joint either because the stopper material has become hardened, the plug itself is tilted, or the plug does not properly engage the seat.

A further objection is that the plug is spaced from or does not make a firm connection with the seat and allows the contents of the bowl or another container to escape between the plug and the seat.

The present invention overcomes these objections by making the plug with resilient engaging spring arms of thin and flexible material for positively engaging the hub of the cross grid of the drain seat to hold the plug firmly in position, for making it unnecessary to turn the plug in one direction or the other to hold it in place, to draw the plug downwardly and confine it in its downward engaging position, and to yieldingly restrain the plug from being withdrawn from such engagement except by a definite and positive manual movement outwardly and without the necessity of twisting it.

Among the objects of the invention are: to provide a plug with thin flexible converging arms which engage opposite edges of the hub of a radial grid spider in the seat so that the plug is manually pressed directly inward and pulled directly outward to engage and disengage it with and from the seat; to provide a plug with parts secured firmly together leaving a groove into which a flexible ring gasket may be inserted; to provide a ring of flexible sealing material which may be applied to the plug after it is assembled and in which the rings may be increased in size at the outer periphery thereof; and to make a firm waterproof engagement all around the seat and to dispose the hub of the grid arms to draw and hold the plug inwardly with respect to the seat.

Other objects of the invention will hereafter appear and will be more apparent from the accompanying drawing in which, FIG. 1 is a top perspective of a drain plug and its corresponding seat in accordance with the present invention.

FIG. 2 is a bottom view of the plug with the lower plate omitted; FIG. 3 is a composite view of the parts of the plug and seat shown in perspective from the upper sides of the parts; FIG. 4 is a composite view of the parts of the plug and seat shown in perspective from the lower sides of the parts; FIG. 5 is a sectional view of a plug in accordance with this invention; and FIG. 6 is a sectional view of a drain plug having a single flexible partition applied to a grid drain seat, drawn downwardly and held resiliently in place by the engagement of the flexible arms of the drain plug with the spider hub of the grid seat.

This drain plug may be applied to any grid seat with which it cooperates so that it may be sold separately from the seat, but applied thereto, but it is intended to be used in connection with this specific seat having a central spider or hub so that the opposite spring arms of the plug will engage opposite sides of the hub or center of the grid spider in order to draw the plug yieldingly in connection with the grid seat, and also to hold it more positively in proper engagement therewith. The grid seat is usually applied to the bottom of a bowl, sink, bathtub or other receptacle to which the plug is applied. The sealing means comprises a rubber or flexible gasket which is separable and replaceable.

Referring now more particularly to the drawings, a metal grid seat 10 is commonly inserted at the bottom of a bowl, sink, washtub or other receptacle for containing liquids and usually it is formed with a bottom spider comprising radiating arms 12 which extend from a common center or hub 13 so that materials larger than the openings between the arms are not drawn downwardly to clog the discharge opening or the passage therefrom. This seat is usually cemented or otherwise fastened in place to make a fluid-tight joint around the outside of it. Into this seat 10, a drain plug 14 is insertable having an upper circular part 16 with a finger hold extension 18 at the top and a circular flat bottom surface 20 cast or formed integral with the entire upper part, and the lower surface of the bottom 20 having a shallow flat recess 22 with rounded ends and openings or holes 24, one at the center of each rounded end of the recess 22 extending upwardly into or through the bottom 20 preferably projecting through the circular part 16 and opening at opposite sides of the finger hold extension 18.

At the marginal lower edge of the circular flat bottom 20 is a shoulder 25 which is disposed inwardly from the circular edge of the flat bottom surface 20 to provide a space for the insertion of a circular gasket or ring 26 composed of rubber, plastic or rubber-like material with some resilience and adapted to be sprung into place against the shoulder 25 and between it and a second or lower piece 27 forming the lower part of the plug. This lower piece 27 is preferably circular and of the same diameter as the flat bottom 20 of the upper part, it is a somewhat thinner piece of metal than the flat bottom and is adapted to engage tightly against the shouldered portion 25 leaving a peripheral space between the flat bottom 20 of the upper piece and the lower or second piece in which to insert the gasket or rubber ring 26.

Extending transversely across the central part of this second piece 27 is a slot 28 which terminates short of both of the opposite sides of this piece and on opposite sides of the slot are projections 29 spaced to register with the openings 24 through the upper piece in the opposite rounded end portions of the flat recess 22.

This slot 28 is sufficiently wide to receive the extremities of a resiliently bent wire 30 to be inserted therethrough with the two rounded ends 32 of the wire extending below or outwardly from the second piece, and having two connected and continuous loops 34 extending oppositely and at right angles to the bent ends of the wire at the center and being continuous therewith.

The two rounded loops 34 of this bent wire are disposed in the same plane and the wire is of a thickness to be flatly contained within the recess 22, the rounded loops 34 extending around the central openings 24 of this flat recess and the lower piece being applied to the upper part with the projections 29 inserted through the loops 34 and pressed tightly in place in the openings 24 of the upper piece to bind, compress and hold the second or lower piece in engagement with the upper part 16 with the spring ends 32 of the wire extending from the bottom through the slot 28.

In this, it will be understood that the parts are pressed tightly together with the bent wire loops 34 contained in the flat shallow recess 22, but the circular gasket 26 is separated therefrom and is resiliently applied over the plug to be seated in the peripheral recess between the upper and lower piece 16 and 27 made by the shoulder 25 in the upper piece. These rings or gaskets 26 may be made of neoprene, rubber or any other suitable, flexible and resilient material; they are applied over the assembled plug pieces and are sprung into place in the annular recess between them, and the rings may be made of one or more thicknesses if desired. Broken or used gaskets 26 may be removed and replaced as desired, and other gaskets larger and smaller in their outer diameter may be inserted.

With this construction, the entire plug is complete, the resilient wire ends 32 project from the bottom of the plug to embrace the arms 12 of the plug seat preferably at the hub 13 thereof, the end portions of the wire 30 near the extremities thereof having an angular bent 36 inwardly toward each other so that the extremities 32 flare outwardly therefrom, the outwardly flaring ends assisting in inserting the plug into the grid seat, but the ends of the wires being resilient, the bent portions 36 thereof near the ends of the wire tend to draw the plug downwardly against the seat or central portion thereof, and when once inserted with the periphery or edge of the gasket 26 against the seat as shown in FIG. 6, the resilient ends of the wire 30 are thus drawn inwardly tending to hold the plug more firmly upon the grid seat so that the finger hold portions 18 of the plug must be engaged to manually withdraw a plug from the seat. If desired, the finger hold portion may be provided with a transverse opening 38 in which a wire or cord 40 may be connected to assist in withdrawing the plug from its seat and also to provide a chain or cord 40 which may be fastened or attached for safe keeping.

While a preferred form of the invention is shown in some detail, it should be regarded as an illustration or example rather than as a limitation or restriction of the invention, since various changes in the construction, combination and arrangement of the parts may be made without departing from the spirit and scope of the invention.

I claim:

1. A plug for a drain opening, comprising a flat circular flexible ring gasket of rubber-like materials, upper and lower metal plug parts, the upper plug part having a circular bottom with a peripheral shoulder and an upwardly extending thumb piece and the lower plug part being flat and of the same diameter as the bottom of the upper plug piece, the gasket interposed in the recess formed by said shoulder between the two plug parts when placed together and the peripheral edge thereof extending from the circular bottom, the upper side of the said bottom being formed with a flat shallow recess round at both ends and terminating at both ends a short distance from the periphery of the bottom, and with perforations through the bottom in the round end portions in the lower plug part having a slot therethrough and projections extending through the openings near the ends of the shallow recess of the upper bottom part to clamp the upper and lower parts tightly together, and a coil spring having two loops seated in the flat recess surrounding the projection of the lower plug part therein and loose ends extending through the slot to the outside of the lower plug part for resilient engagement and movement.

2. The combination of a circular plug seat having a central spider with radial arms extending therefrom for restricting the discharge opening from a receptacle to which is attached, and a plug having two metal parts with circular edges of approximately the same size, adapted to be placed together and one of the parts having a reduced shouldered portion forming a circular peripheral recess between them, a flat rubber-like ring inserted in the peripheral recess between the two plug parts and projecting therefrom to engage the grid seat and form a watertight connection, the upper plug part having a flat shallow recess at its bottom with openings therethrough near the ends of the recess, the lower plug part having projections which extend through the recesses in the upper plug part to secure them together, the lower plug part having a slot disposed across the flat recess of the upper part, and a flexible spring wire with opposite intermediate loops to fit in the ends of the flat openings of the upper part surrounding said projections, the ends of the wire extending through the slot in the lower plug part and spaced apart to engage opposite sides of the spider of the grid seat to guide the plug in place attaching it to the seat and to prevent the plug from turning upon the seat and to hold the plug resiliently downward in engagement with the seat.

References Cited in the file of this patent

UNITED STATES PATENTS

| 629,196 | Little | July 18, 1899 |
| 1,014,389 | Haff | Jan. 9, 1912 |
| 1,939,569 | Pfister | Dec. 12, 1933 |
| 2,214,428 | Place | Sept. 17, 1940 |